(12) United States Patent
Yamagishi

(10) Patent No.: US 9,036,228 B2
(45) Date of Patent: May 19, 2015

(54) IMAGE PROCESSING DEVICE, IMAGE PROCESSING METHOD, AND IMAGE PROCESSING PROGRAM RECORDING MEDIUM

(75) Inventor: Hideki Yamagishi, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 907 days.

(21) Appl. No.: 13/023,171

(22) Filed: Feb. 8, 2011

(65) Prior Publication Data
US 2011/0194130 A1 Aug. 11, 2011

(30) Foreign Application Priority Data
Feb. 10, 2010 (JP) .................................. 2010-027631

(51) Int. Cl.
| | |
|---|---|
| G03F 3/08 | (2006.01) |
| G06F 15/00 | (2006.01) |
| G06K 1/00 | (2006.01) |
| G06K 9/00 | (2006.01) |
| G06K 9/36 | (2006.01) |
| G09G 5/02 | (2006.01) |
| H04N 1/60 | (2006.01) |

(52) U.S. Cl.
CPC .................................. *H04N 1/6058* (2013.01)

(58) Field of Classification Search
USPC .......... 358/1.9, 518, 520, 519, 530, 532, 538; 382/162, 166, 167; 345/590
See application file for complete search history.

(56) References Cited

U.S. PATENT DOCUMENTS

| | | | | |
|---|---|---|---|---|
| 7,177,465 | B1* | 2/2007 | Takahira | 382/166 |
| 7,308,135 | B2* | 12/2007 | Spaulding et al. | 382/162 |
| 7,729,011 | B2* | 6/2010 | Harigai | 358/1.9 |
| 7,830,567 | B2* | 11/2010 | Higashikata et al. | 358/518 |
| 7,961,366 | B2* | 6/2011 | Yamazoe | 358/519 |
| 8,115,978 | B2* | 2/2012 | Kawai | 358/518 |
| 2003/0164968 | A1* | 9/2003 | Iida | 358/1.9 |

(Continued)

FOREIGN PATENT DOCUMENTS

| | | |
|---|---|---|
| JP | 2003-244460 A | 8/2003 |
| JP | 2006013608 A | 1/2006 |

(Continued)

OTHER PUBLICATIONS

Notification of Reasons for Refusal, dated Apr. 23, 2013, issued in corresponding JP Application No. 2010-027631, 5 pages in English and Japanese.

*Primary Examiner* — Fred Guillermety
*Assistant Examiner* — Jonathan R Beckley
(74) *Attorney, Agent, or Firm* — Sughrue Mion, PLLC

(57) ABSTRACT

An image processing device comprises: a first output device having a first color gamut and outputting an image based on a given first color reproduction target value; a second output device having a second color gamut and outputting an image based on a second color reproduction target value; a color gamut information acquirer for acquiring a first color gamut information relating to the first color gamut of the first output device and a second color gamut information relating to the second color gamut of the second output device; and a target value generator for producing a second color reproduction target value for the second output device by correcting the given color reproduction target value for the first output device based on acquired first and second color gamut information by the color gamut information acquirer.

24 Claims, 13 Drawing Sheets

(56) References Cited

U.S. PATENT DOCUMENTS

2006/0232803 A1* 10/2006 Hori et al. ................... 358/1.9
2010/0195125 A1* 8/2010 Nagashima ................. 358/1.9

FOREIGN PATENT DOCUMENTS

| JP | 2006345187 A | 12/2006 |
| JP | 2009219062 A | 9/2009 |

* cited by examiner

IMAGE PROCESSING DEVICE, IMAGE PROCESSING METHOD, AND IMAGE PROCESSING PROGRAM RECORDING MEDIUM

BACKGROUND OF THE INVENTION

The present invention relates to an image processing device and an image processing method and particularly to a device and a method for producing a color reproduction target value for a second output device based on the color reproduction by a first output device.

The present invention also relates to a recording medium storing a program for causing a computer to execute such an image processing method.

Output devices for printing such as printers have different color reproduction ranges (color gamuts). Where, therefore, color reproduction is to be effected by a first output device and a second output device having different color gamuts based on a common input color signal, as, for example, where printing is first effected by the first output device (primary printing), followed by printing (reprinting) by the second output device, which is a different output device from the first output device, it was possible that the colors reproduced by the first output device and the second output device were different.

Therefore, JP 2003-244460 proposes changing the mapping in the first output device and the second output device based on the color gamut of a device supplying an input color signal and the color gamut of an output device when the first output device or the second output device maps a reproduced color value for the input color signal in their color space.

However, the color gamut of the first output device is not taken into consideration in the second output device when the color reproduction target value is produced and the color reproduction target value is determined based only on the color gamut of the device supplying the input color signal and the color gamut of the second output device, so that it is possible that the color reproduction effected by mapping into the second output device having a different color gamut from that of the first output device may not be approximated to the color reproduction by the first output device.

An object of the present invention is to provide an image processing device and method capable of achieving color reproduction in a second output device close to the color reproduction by the first output device and using the color gamut of the second output device.

Another object of the present invention is to provide a recording medium storing a program for causing a computer to execute such an image processing method.

An image processing device according to the present invention comprises:

a first output device having a first color gamut and outputting an image based on a given first color reproduction target value;

a second output device having a second color gamut and outputting an image based on a second color reproduction target value;

a color gamut information acquirer for acquiring a first color gamut information relating to the first color gamut of the first output device and a second color gamut information relating to the second color gamut of the second output device; and a target value generator for producing a second color reproduction target value for the second output device by correcting the given color reproduction target value for the first output device based on acquired first and second color gamut information by the color gamut information acquirer.

An image processing method according to the present invention comprises the steps of:

acquiring a first color gamut information relating to a first color gamut of a first output device and a second color gamut information relating to a second color gamut of a second output device; and producing a second color reproduction target value for the second output device by correcting a given first color reproduction target value for the first output device based on the acquired first color gamut information and the acquired second color gamut information.

An image processing program recording medium according to the present invention stores an image processing program for causing a computer to execute an image processing method, the image processing program comprising the steps of:

acquiring a first color gamut information relating to a first color gamut of a first output device and a second color gamut information relating to a second color gamut of a second output device; and producing a second color reproduction target value for the second output device by correcting a given first color reproduction target value for the first output device based on the acquired first color gamut information and the acquired second color gamut information.

DETAILED DESCRIPTION OF THE INVENTION

The present invention is described in detail hereinafter based on the preferred embodiments shown in the accompanying drawings.

Embodiment 1

Figure 1:
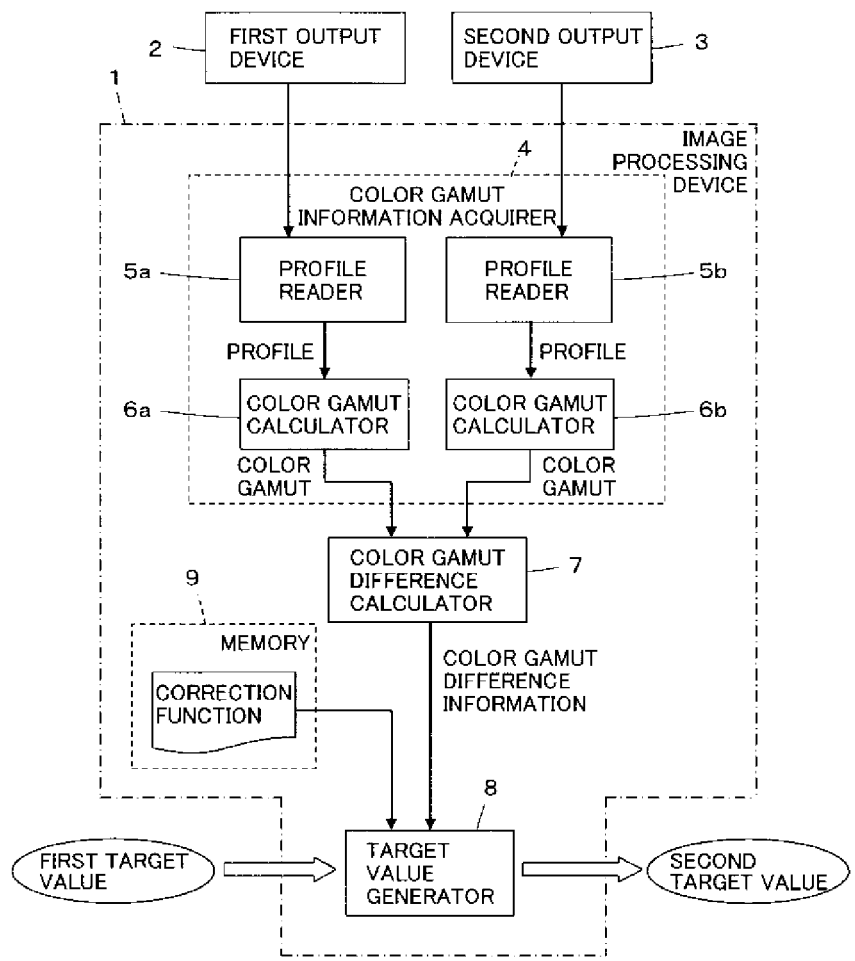
FIG. 1 is a block diagram illustrating a configuration of an image processing device according to Embodiment 1 of the present invention.

FIG. 1 illustrates a configuration of an image processing device 1 according to Embodiment 1 of the present invention. The image processing device 1 comprises color gamut information acquirer 4 connected to a first output device 2 and a second output device 3.

The color gamut information acquirer 4 comprises profile readers 5a, 5b and color gamut calculators 6a, 6b. The profile reader 5a is connected to the first output device 2; the profile reader 5b is connected to the second output device 3. The profile reader 5a reads the profile of the first output device 3; the profile reader 5b reads the profile of the second output device 3. The profiles contain information such as color gamut information and mapping information for converting an input color signal into a color reproduction target value (first target value or second target value) allocated to the color gamut of the first output device 2 or the second output device 3

The profile reader 5a is connected to the color gamut calculator 6a; the profile reader 5b is connected to the color gamut calculator 6b. The color gamut calculator 6a calculates the color gamut information of the first output device 2 from the profile read by the profile reader 5a; the color gamut calculator 6b calculates the color gamut information of the second output device 3 from the profile read by the profile reader 5b.

The color gamut calculators 6a and 6b are connected to a color gamut difference calculator 7. The color gamut difference calculator 7 calculates color gamut difference information based on the color gamut information of the first output device 2 entered from the color gamut calculator 6a and the color gamut information of the second output device 3 entered from the color gamut calculator 6b. The color gamut difference information contains information such as the distance between the outermost color gamut range of the first output device 2 and the outermost color gamut range of the second output device 3 in each color range.

The color gamut difference calculator 7 is connected to a target value generator 8, which in turn is connected to a memory 9. The memory 9 contains a preset correction function for outputting the reproduced colors close to those by the first output device 2. The target value generator 8 uses the color gamut difference information entered from the color gamut difference calculator 7 and the correction function read from the memory 9 to correct the color reproduction target value in the first output device 2 or a first target value in order to produce a second target value, which is the color reproduction target value in the second output device 3.

Figure 2:
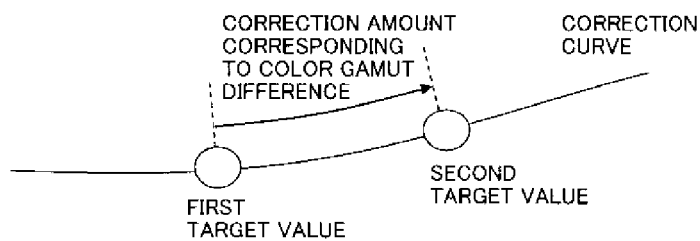
FIG. 2 is a view illustrating a method of producing a second target value in Embodiment 1.

The correction function stored in the memory 9 corresponds to the first target value and may be represented, for example, as a curved line passing through the first target value as illustrated in FIG. 2. The target value generator 8 uses the color gamut difference information entered from the color gamut difference calculator 7 to move the first target value along the curved line, which is referred to as "correction curve" below, by a correction amount obtained from the difference between the color gamut of the first output device 2 and the color gamut of the second output device 3, thereby producing the second target value.

Next, the operation of the image processing device 1 according to Embodiment 1 illustrated in FIG. 1 will be described.

First, the profile of the first output device 2 is read by the profile reader 5a and outputted to the color gamut calculator 6a. Likewise, the profile of the second output device 3 is read by the profile reader 5b and outputted to the color gamut calculator 6b. The color gamut calculator 6a calculates the color gamut information of the first output device 2 from the profile of the first output device 2 and outputs the calculated color gamut information to the color gamut difference calculator 7. The color gamut calculator 6b also calculates the color gamut information of the second output device 3 from the profile of the second output device 3 and outputs the calculated color gamut information to the color gamut difference calculator 7.

The color gamut difference calculator 7 uses the color gamut information of the first output device 2 and the color gamut information of the second output device 3 entered respectively from the color gamut calculators 6a, 6b to calculate the color gamut difference information between them, which is outputted to the target value generator 8.

Upon receiving color gamut difference information from the color gamut difference calculator 7, the target value generator 8 reads the correction function from the memory 9 and, as illustrated in FIG. 2, moves the first target value along the correction curve by a correction amount obtained from the difference between the color gamut of the first output device 2 and the color gamut of the second output device 3, thereby producing the second target value.

The image processing device 1 according to Embodiment 1 achieves color reproduction in the second output device 3 that is close to the color reproduction by the first output device 2 and which uses a color gamut of the second output device 3.

Figure 3:
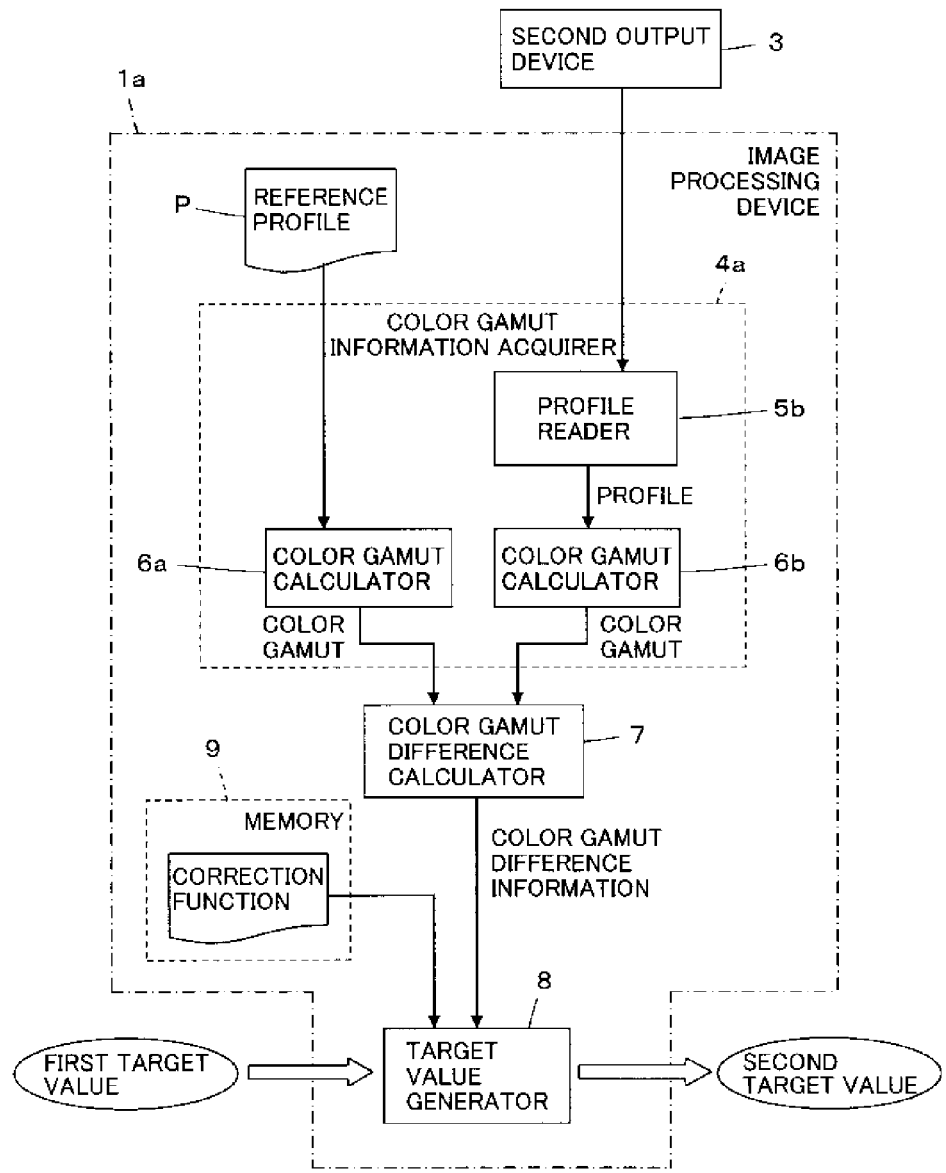
FIG. 3 is a block diagram illustrating a configuration of an image processing device according to a modification of Embodiment 1.

According to this embodiment, a reference profile may be preset instead of the profile reader 5a reading the profile of the first output device 2. For example, the profile of an output device that has been preset as reference may be used as a reference profile P as in an image processing device 1a illustrated in FIG. 3 so that a color gamut calculator 6a of a color gamut information acquirer 4a may calculate the color gamut information of the reference output device from this reference profile P. The profile of the second output device 3 is read by the profile reader 5b, whereupon a color gamut calculator 6b uses this profile to calculate color gamut information. The color gamut difference calculator 7 uses the thus obtained color gamut information of the reference output device and the color gamut information of the second output device 3 to calculate the information on a color gamut difference between them, which information is outputted to the target value generator 8. The target value generator 8 uses the color gamut difference information entered from the color gamut difference calculator 7 and the correction function read from the memory 9 to correct the first target value in order to produce the second target value.

Thus, the second target value for the second output device 3 can be produced by determining a given reference output device and using its reference profile P without the need to read the profile from the existing first output device 2.

Further, reference color gamut information may be previously stored in the image processing device 1a instead of the color gamut calculator 6a calculating the color gamut information of the reference output device from the reference profile P. In this case, the color gamut calculator 6a is not necessary as the color gamut difference calculator 7 may calculate the color gamut difference information from the previously stored reference color gamut information and the color gamut information of the second output device 3 calculated by the color gamut calculator 6b.

Figure 4:
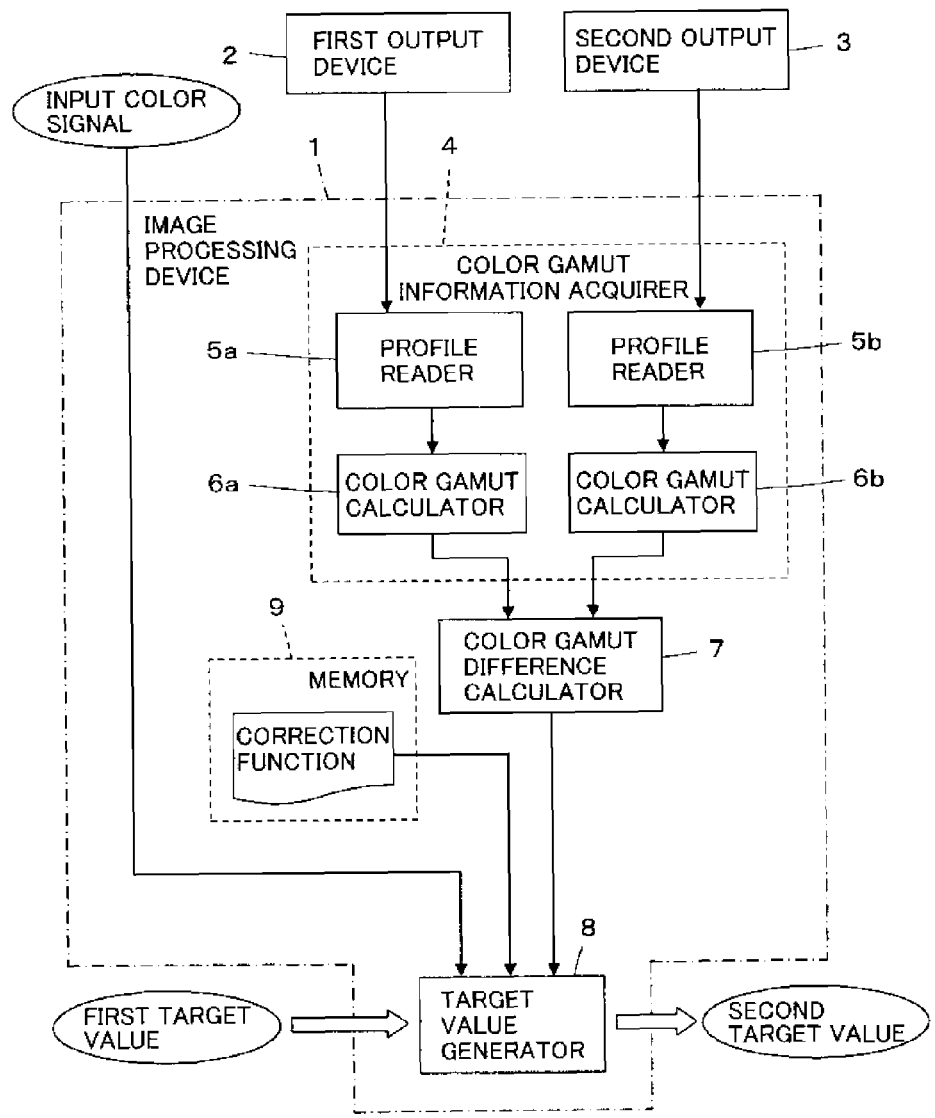
FIG. 4 is a block diagram illustrating a configuration of an image processing device according to another modification of Embodiment 1.

According to Embodiment 1, the second target value may also be produced by allowing the target value generator 8 to correct the first target value based on the color gamut difference information calculated by the color gamut difference calculator 7, the correction function stored in the memory 9, and the color gamut information of the input color signals (such as a reversal, an image acquired by a digital still camera, an image acquired by a digital video camera, or a computer graphic) as illustrated in FIG. 4.

Such configuration enables color reproduction still closer to the color reproduction by the first output device by corresponding to the color information of the input color signal.

The color information of the input color signal that may be used include color information, color distribution range information, or color space information corresponding to one or more input color signal (e.g., Adobe RGB, sRGB, and Japan-Color.

The correction function stored in the memory 9 may, for example, be one previously produced that allows reproduced colors close to those produced by the first output device 2 by conducting a psychophysical experiment.

The first output device 2 and the second output device 3 may comprise a color gamut of a single channel such as K, C, M, or Y or a color gamut of a plurality of channels such as RGB, WRGB, CMY, CMYK, CMYKOGB, or CMYKL-CLM.

The first output device 2 and the second output device 3 may be an output device such as a printer or a monitor.

Embodiment 2

Figure 5:
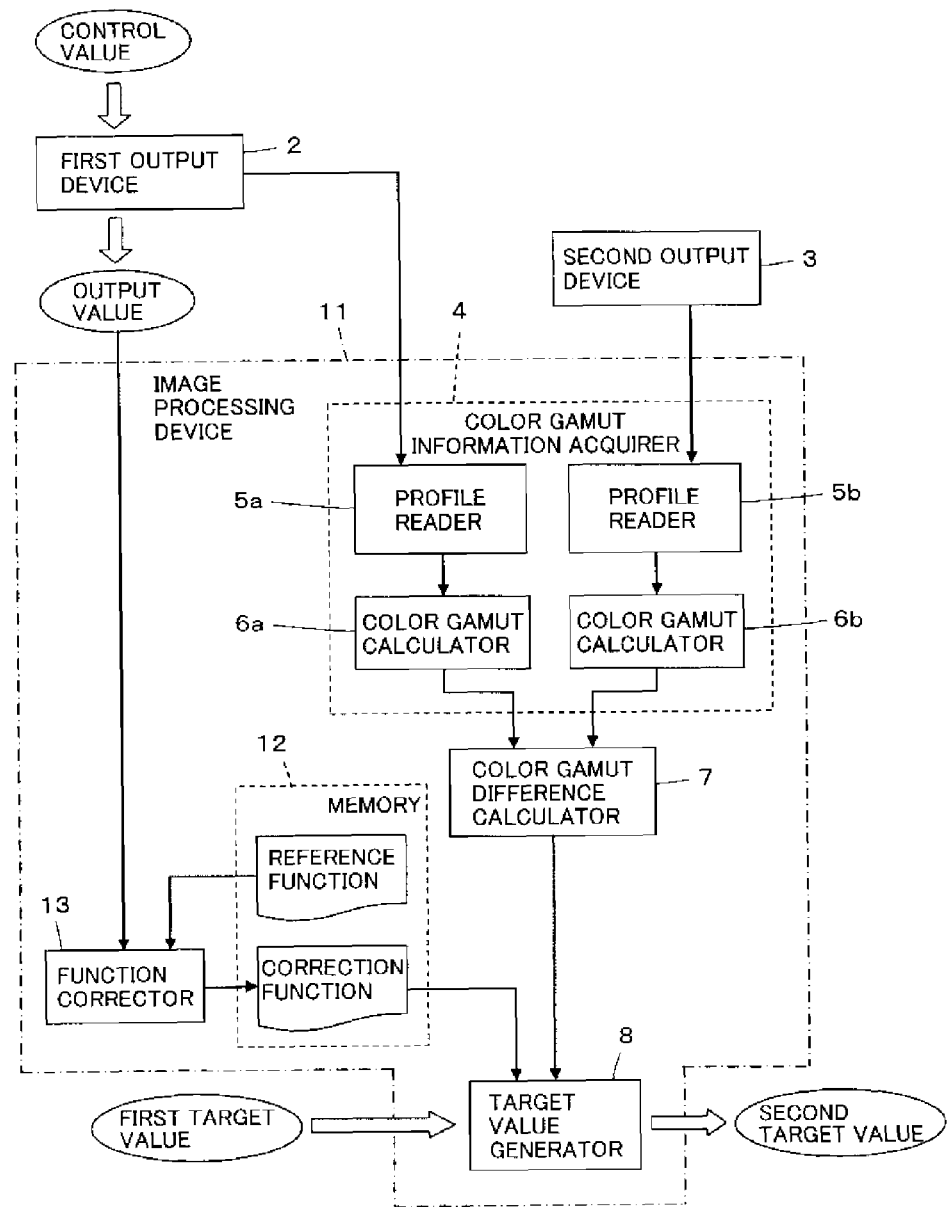
FIG. 5 is a block diagram illustrating a configuration of an image processing device according to Embodiment 2.

FIG. 5 illustrates a configuration of an image processing device 11 according to Embodiment 2. This image processing device 11 has a memory 12, instead of the memory 9, connected to the target value generator 8 and a function corrector 13 connected to the memory 12 as compared with the image processing device 1 according to the Embodiment 1 illustrated in FIG. 1.

The memory 12 has a preset reference function stored therein based on a plurality of color reproduction targets in a plurality of standard color gamuts corresponding to a given control value. This reference function represents a relationship between color reproduction targets close to each other even in color gamuts different from each other and may for example be obtained by conducting a psychophysical experiment.

Figure 6:
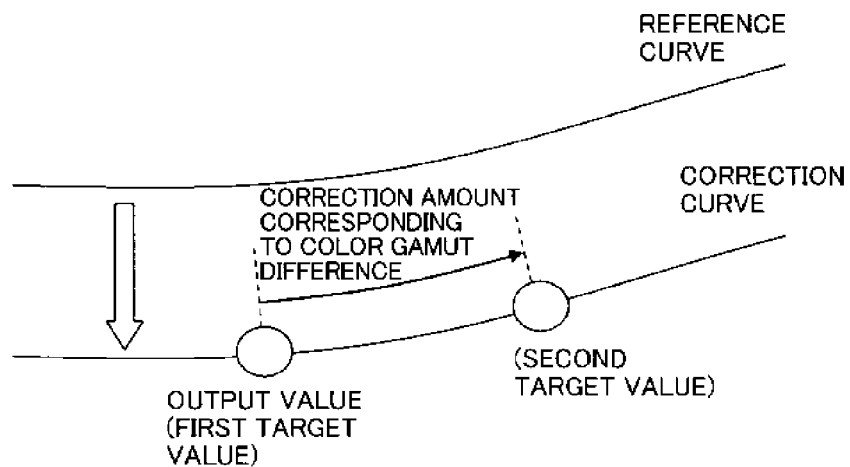
FIG. 6 is a view illustrating a method of producing a second target value in Embodiment 2.

The function corrector 13 corrects the reference function stored in the memory 12 based on an output value or a measured color value obtained through the first output device 2 for a given control value to obtain a correction function. As illustrated in FIG. 6, for example, suppose that the reference function is represented as a reference curve, a correction curve is obtained by moving the reference curve so as to pass through the output value (first target value) of the first output device 2. The function representing this correction curve is the correction function.

The function corrector 13 corrects the reference function stored in the memory 12 based on the output value of the first output device 2 for a given control value to produce a correction function corresponding to the first output device 2 and stores the correction function in the memory 12.

Next, as with Embodiment 1, the profiles of the first output device 2 and the second output device 3 are entered through the profile readers 5a, 5b in the color gamut calculators 6a, 6b, respectively. The color gamut calculators 6a, 6b calculates color gamut information from their respective profiles, whereupon the color gamut difference calculator 7 calculates and outputs color gamut difference information from the color gamut information to the target value generator 8.

The target value generator 8 reads the correction function from the memory 12 and, as illustrated in FIG. 6, moves the first target value along the correction curve by a correction amount obtained from the difference between the color gamut of the first output device 2 and the color gamut of the second output device 3, thereby producing the second target value.

Embodiment 2, which obtains the correction function based on the output value of the first output device 2, achieves color reproduction in the second output device 3 that is close to the color reproduction by the first output device 2 and which uses the color gamut of the second output device 3 even when using any given output device as the first output device 2. For example, setting the first output device and the second output device after an output has been produced suffices to easily achieve color reproduction in the second output device that is close to the color reproduction by the first output device without the need to previously making the settings of the first output device 2 and the second output device 3 in a plurality of output devices.

Embodiment 3

Figure 7:
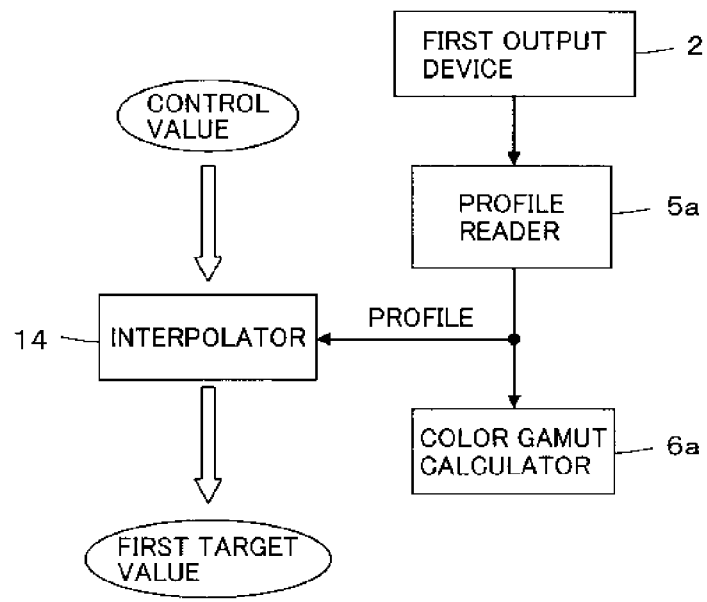
FIG. 7 is a block diagram illustrating a part of a configuration of an image processing device according to Embodiment 3.

In the image processing device 11 according to Embodiment 2 as illustrated in FIG. 7, the profile reader 5a for reading the profile of the first output device 2 may be connected with an interpolator 14.

Although the first target value to be corrected by the target value generator 8 is preferably the target value located at a given lattice position in the color gamut of the first output device 2 to facilitate mapping, use of, for example, a memory color (e.g., skin color, color of the sky) as the control value is effective in improving the color reproduction.

Accordingly, in Embodiment 3, the interpolator 14 uses the profile of the first output device 2 read by the profile reader 5a to obtain an output value for the control value and interpolates the output value to calculate the first target value at a given lattice position in the color gamut of the first output device 2. The target value generator 8 produces a second target value at a given lattice position using the first target value thus calculated.

Embodiment 3 enables still more excellent color reproduction in the second output device 3 by using, for example, a memory color as control value.

Embodiment 4

Figure 8:
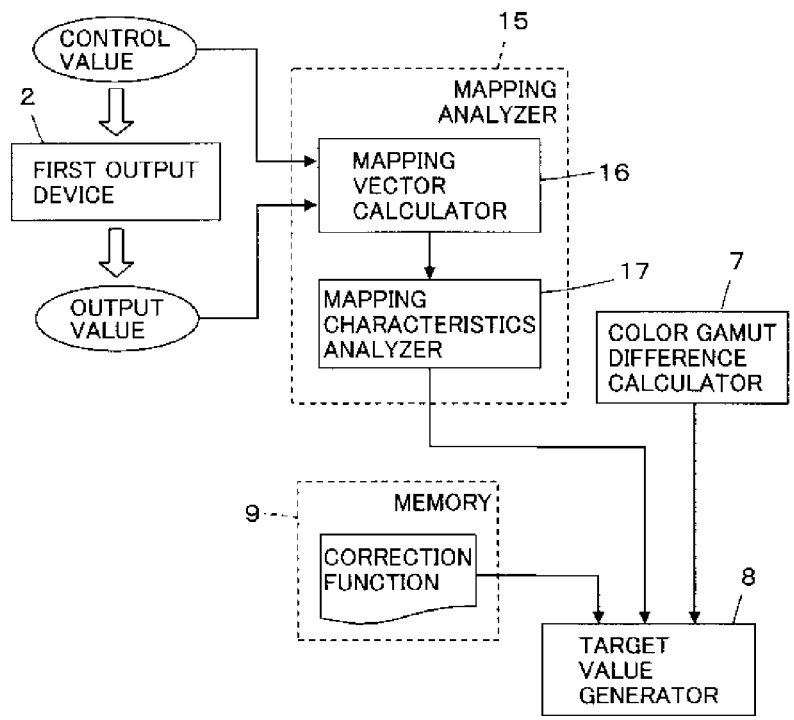
FIG. 8 is a block diagram illustrating a part of a configuration of an image processing device according to Embodiment 4.
Figure 9:
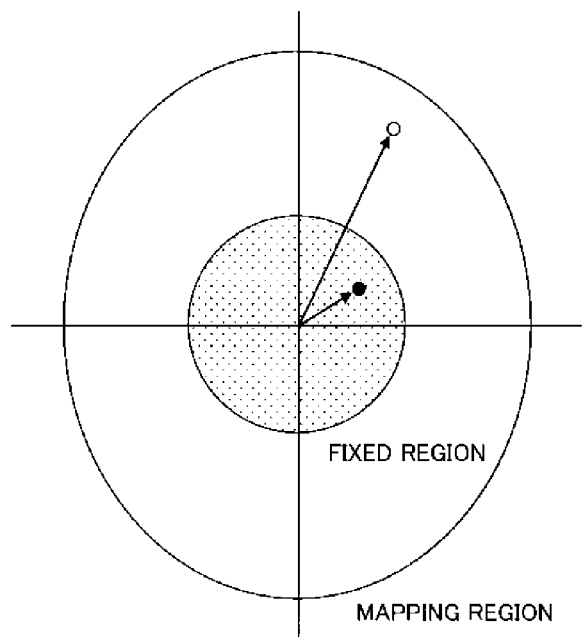
FIG. 9 is a view illustrating a relationship between a fixed region and a mapping region in Embodiment 4.

In the image processing device according to Embodiments 1 to 3, the target value generator 8 may be connected with a mapping analyzer 15 as illustrated in FIG. 8. The mapping analyzer 15 comprises a mapping vector calculator 16 and a mapping characteristics analyzer 17.

The mapping vector calculator 16 calculates the mapping vector of the first output device 2 by subtracting the control value from the output value based on a given control value entered in the first output device 2 and the output value for this control value. The calculated mapping vector is outputted to the mapping characteristics analyzer 17, where the mapping characteristics in the first output device 2 are analyzed from the mapping vector.

The mapping characteristics include a mapping vector magnitude distribution and a mapping compression ratio distribution. For example, the mapping characteristics analyzer 17 analyzes the mapping vector magnitude distribution and specifies a region having a mapping vector that is smaller than a given value as a fixed region and specifies a region having a mapping vector that is equal to or greater than a given value as a mapping region. Information of the specified fixed region and mapping region is outputted to the target value generator 8. Based on information entered from the mapping characteristics analyzer 17, the target value generator 8 judges that the color reproduction target value for the first output device 2 need not be corrected for the first target value existing in the fixed region because the mapping vector is small and outputs the first target value as it is as the second target value without correction and, for the first target value existing in the mapping region, produces the second target value by correcting the first target value based on the color gamut difference information entered from the color gamut difference calculator 7 and the correction functions read from the memories 9, 12.

Likewise, whether to correct the first target value may be decided according to the magnitude of the mapping compression ratio.

The mapping characteristics analyzer 17 analyzes the chroma or luminosity weighting characteristics in the mapping in the first output device 2 from the mapping vector whereas the target value generator 8 adds the mapping weighting to the correction functions based on those characteristics to produce the second target value.

Embodiment 4 is capable of producing the second target value having the characteristics of the mapping effected by the first output device 2 incorporated therein to an increased degree by analyzing the characteristics of mapping effected by the first output device 2 and reducing the calculation amount needed to produce the second target value.

Embodiment 5

Figure 10:
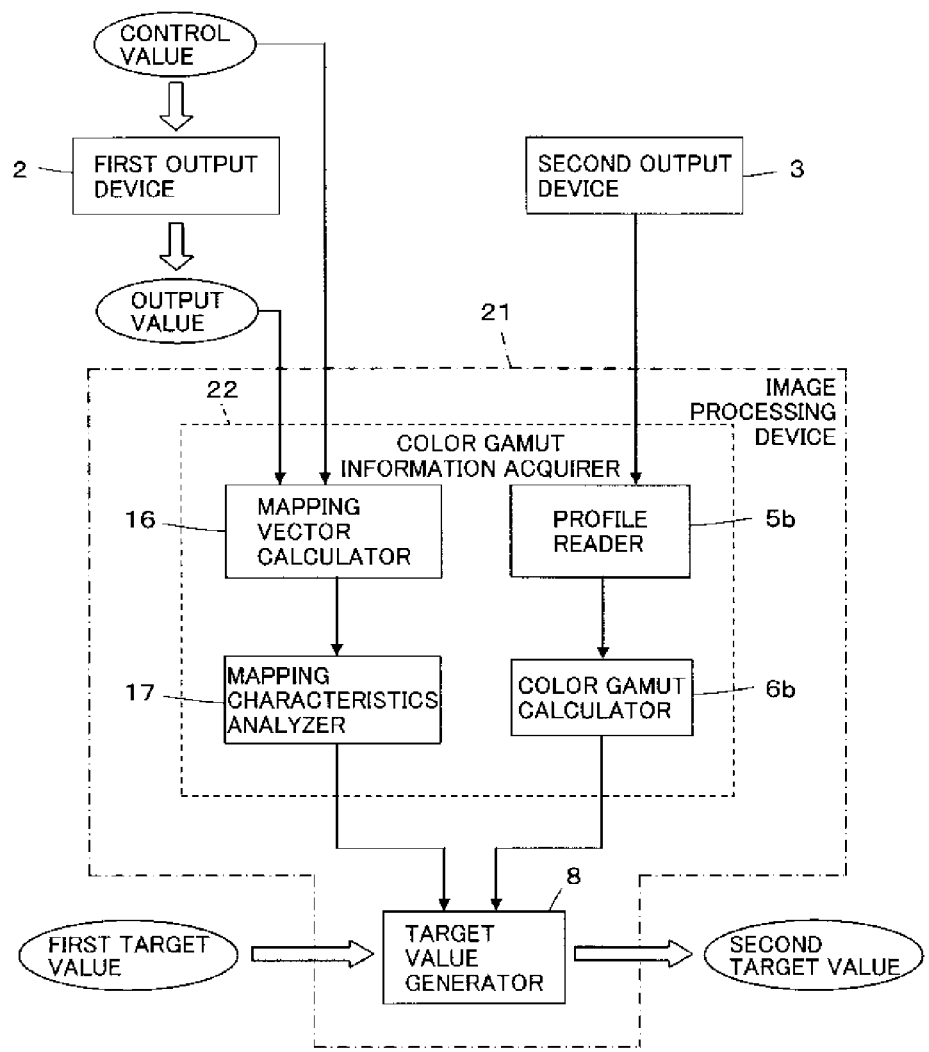
FIG. 10 is a block diagram illustrating a configuration of an image processing device according to Embodiment 5.

FIG. 10 illustrates a configuration of an image processing device 21 according to Embodiment 5. As compared with the image processing device according to Embodiment 1, this image processing device 21 has a color gamut information acquirer 22 instead of the color gamut information acquirer 4. The color gamut information acquirer 22 comprises the profile reader 5b and the profile reader 6b used in Embodiment 1 and the mapping vector calculator 16 and the mapping characteristics analyzer 17 used in Embodiment 4. The color gamut calculator 6b and the mapping characteristics analyzer 17 are connected to the target value generator 8.

The mapping vector calculator 16 calculates the mapping vector of the first output device 2 based on a given control value entered in the first output device 2 and the output value for this control value. The calculated mapping vector is outputted to the mapping characteristics analyzer 17, where the characteristics of the mapping effected by the first output device 2 are analyzed. The analyzed mapping characteristics are outputted to the target value generator 8. Likewise, the profile of the second output device 3 is entered through the profile reader 5b into the color gamut calculator 6b, which calculates the color gamut information from the profile and outputs that information to the target value generator 8.

The target value generator 8 uses the mapping characteristics in the first output device 2 and the color gamut information of the second output device 3 to correct the first target value to enable color reproduction close to that by the first output device 2 and produces the second target value.

Embodiment 5 is capable of producing the second target value having the characteristics of the mapping effected by the first output device 2 incorporated therein to an increased degree by producing the second target value based on the characteristics of mapping effected by the first output device 2.

Figure 11:
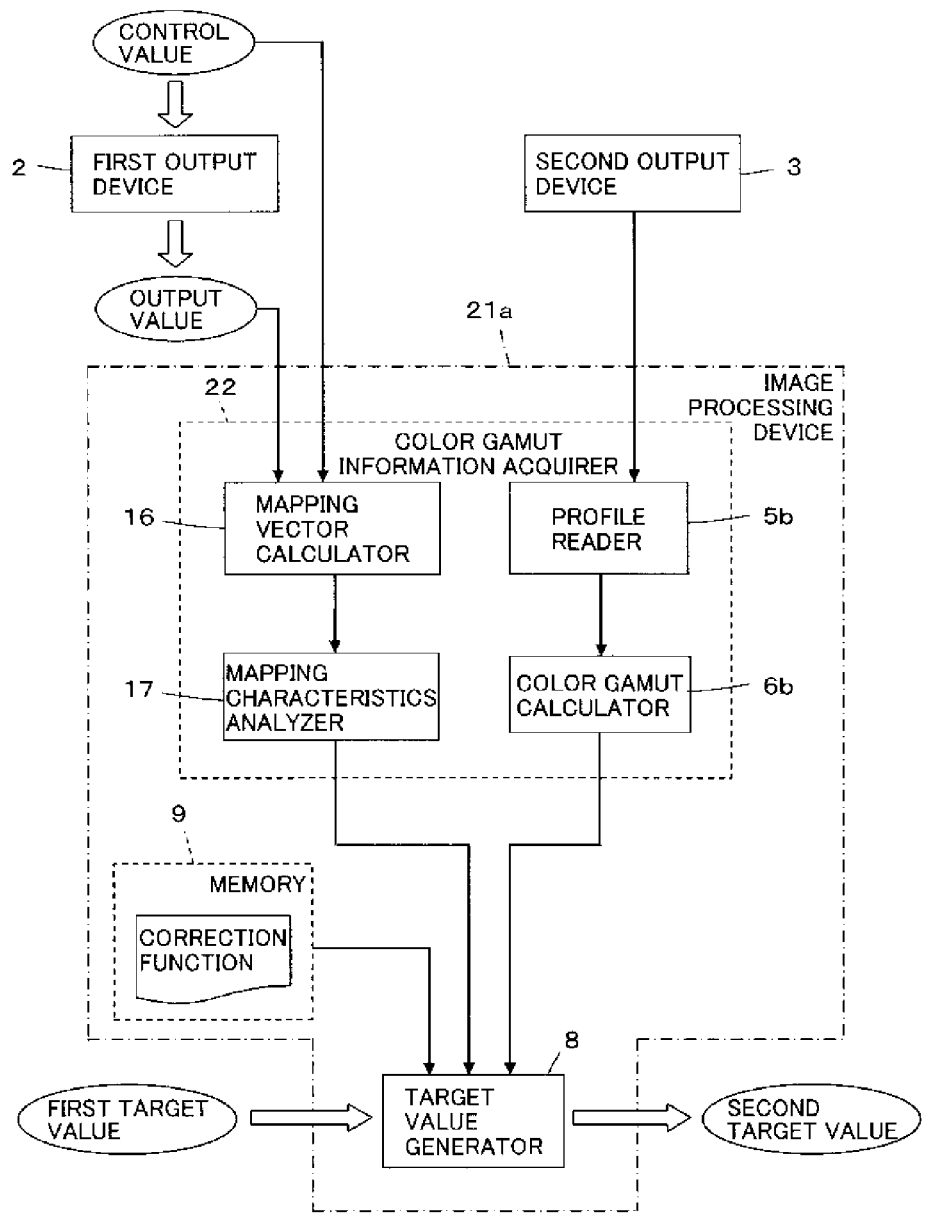
FIG. 11 is a block diagram illustrating a configuration of an image processing device according to a modification of Embodiment 5.

According to this embodiment, the target value generator 8 may use the correction function in addition to the characteristics of mapping effected by the first output device 2 and the color gamut information of the second output device 3 to correct the first target value in order to produce the second target value. For example, the memory 9 storing the correction function can be newly connected to the target value generator 8 as in an image processing device 21a illustrated in FIG. 11.

The target value generator 8 uses the characteristics of mapping effected by the first output device 2 analyzed by the mapping characteristics analyzer 17 and the color gamut information of the second output device 3 calculated by the color gamut calculator 6b to correct the first target value by moving it along the correction function read from the memory 9 in order to produce the second target value. Thus, the second target value can be produced permitting color reproduction close to that achieved by the first output device 2.

Further, because the characteristics of mapping effected by the first output device 2 is analyzed, a fixed region and a mapping region may be determined similarly to Embodiment 4 above, and the first target value may be outputted as it is as the second target value without being corrected for the first target value in the fixed region while, for the first target value existing in the mapping region, the first target value may be corrected, in order to produce the second target value.

Embodiment 6

Figure 12:
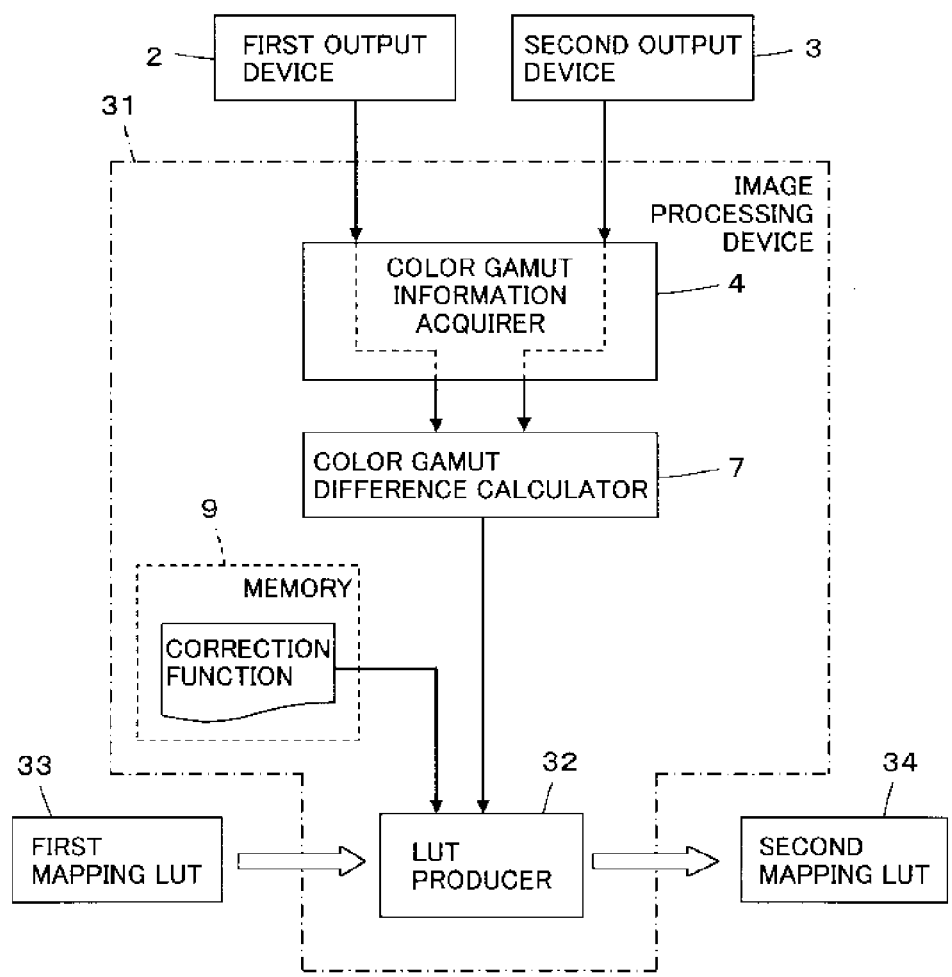
FIG. 12 is a block diagram illustrating a configuration of an image processing device according to Embodiment 6.

FIG. 12 illustrates a configuration of an image processing device 31 according to Embodiment 6. Embodiment 6 is provided to correct a first mapping LUT 33 in the first output device 2 in order to produce a second mapping LUT 34 that can be used in the second output device 3. The image processing device 31 corresponds to the image processing device 1 according to Embodiment 1 illustrated in FIG. 1, provided that an LUT producer 32 instead of the target value generator 8 is connected to the color gamut difference calculator 7 and the memory 9.

As with Embodiment 1, the profiles of the first output device 2 and the second output device 3 are read into the color gamut information acquirer 4, whereupon the color gamut difference calculator 7 calculates the color gamut difference information from the color gamut information and outputs the color gamut difference information to the LUT producer 32.

The LUT producer 32 corrects a plurality of the first target values contained in the first mapping LUT 33 based on the color gamut difference information entered from the color gamut difference calculator 7 and the correction function read from the memory 9 to produce the second target values and uses these second target values to produce the second mapping LUT 34 representing the target value for the output device 3 for the input color signal.

Embodiment 5 enables acquisition of the second mapping LUT 34 for effecting color reproduction that is close to the color reproduction by the first output device 2 and which uses a color gamut of the second output device 3.

Embodiment 7

Figure 13:
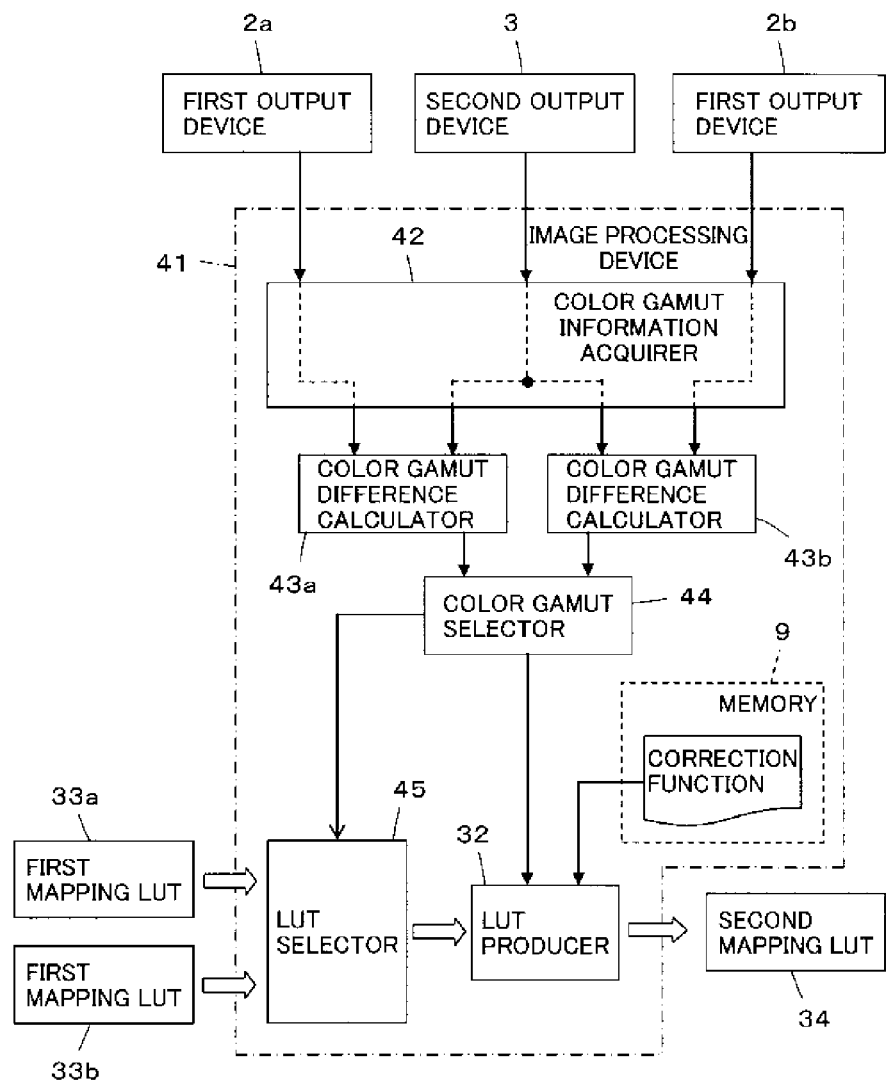
FIG. 13 is a block diagram illustrating a configuration of an image processing device according to Embodiment 7.

FIG. 13 illustrates a configuration of an image processing device 41 according to Embodiment 7. This embodiment is adapted to select one first output device from a plurality of the first output devices in order to produce the second mapping LUT 34. FIG. 13 shows two first output devices, i.e., first output devices 2*a*, 2*b*.

The image processing device 41 comprises a color gamut information acquirer 42 connected to the first output devices 2*a*, 2*b* and the second output device 3 and color gamut difference calculators 43*a*, 43*b* connected to the color gamut information acquirer 42. The image processing device 41 further comprises a color gamut selector 44 connected to the color gamut difference calculators 43*a*, 43*b* and an LUT selector 45 connected to the color gamut selector 44. The color gamut selector 44 and the LUT selector 45 are connected to the LUT producer 32 used in Embodiment 6 illustrated in FIG. 12. The LUT producer 32 is connected to the memory 9.

The profiles of the first output device 2*a*, the first output device 2*b*, and the second output device 3 are read into the color gamut information acquirer 42 whereupon the color gamut information of the first output device 2*a* and the second output device 3 is outputted to one of the color gamut difference calculators, 43*a*, while the color gamut information of the first output device 2*b* and the second output device 3 is outputted to the other color gamut difference calculator 43*b*. The color gamut difference calculator 43*a* calculates the color gamut difference information between the first output device 2*a* and the second output device 3; the color gamut difference calculator 43*b* calculates the color gamut difference information between the first output device 2*b* and the second output device 3. The color gamut difference information thus calculated is outputted to the color gamut selector 44. The color gamut selector 44 selects color gamut difference information having a smaller color difference amount from the color difference information and outputs the selected color difference information to the LUT producer 32 and the LUT selector 45.

The LUT selector 45 uses the color gamut difference information selected by the color gamut selector 20 to select one of the first mapping LUT 33*a* in the first output device 2*a* and the first mapping LUT 33*b* in the first output device 2*b* and outputs the selected first mapping LUT to the LUT producer 32. Specifically, when the color gamut selector 44 judges that the difference in color gamut amount between the first output device 2*a* and the second output device 3 is smaller, the first mapping LUT 33*a* is outputted to the LUT producer 32, whereas when the color gamut selector 44 judges that the difference in color gamut amount between the first output device 2*b* and the second output device 3 is smaller, the first mapping LUT 33*b* is outputted to the LUT producer 32.

The LUT producer 32 uses the color gamut difference information entered from the color gamut selector 44 and the correction function read from the memory 9 to correct the first mapping LUT 33*a* or 33*b* entered from the LUT selector 45 in order to produce the second mapping LUT 34.

The first output devices are not limited to the first output device 2*a* and the first output device 2*b* and may number three or more.

Embodiment 7 enables production of the second mapping LUT capable of still more excellent color reproduction by selecting the color gamut of a plurality of the first output devices having the smallest difference from that of the second output device.

Figure 14:
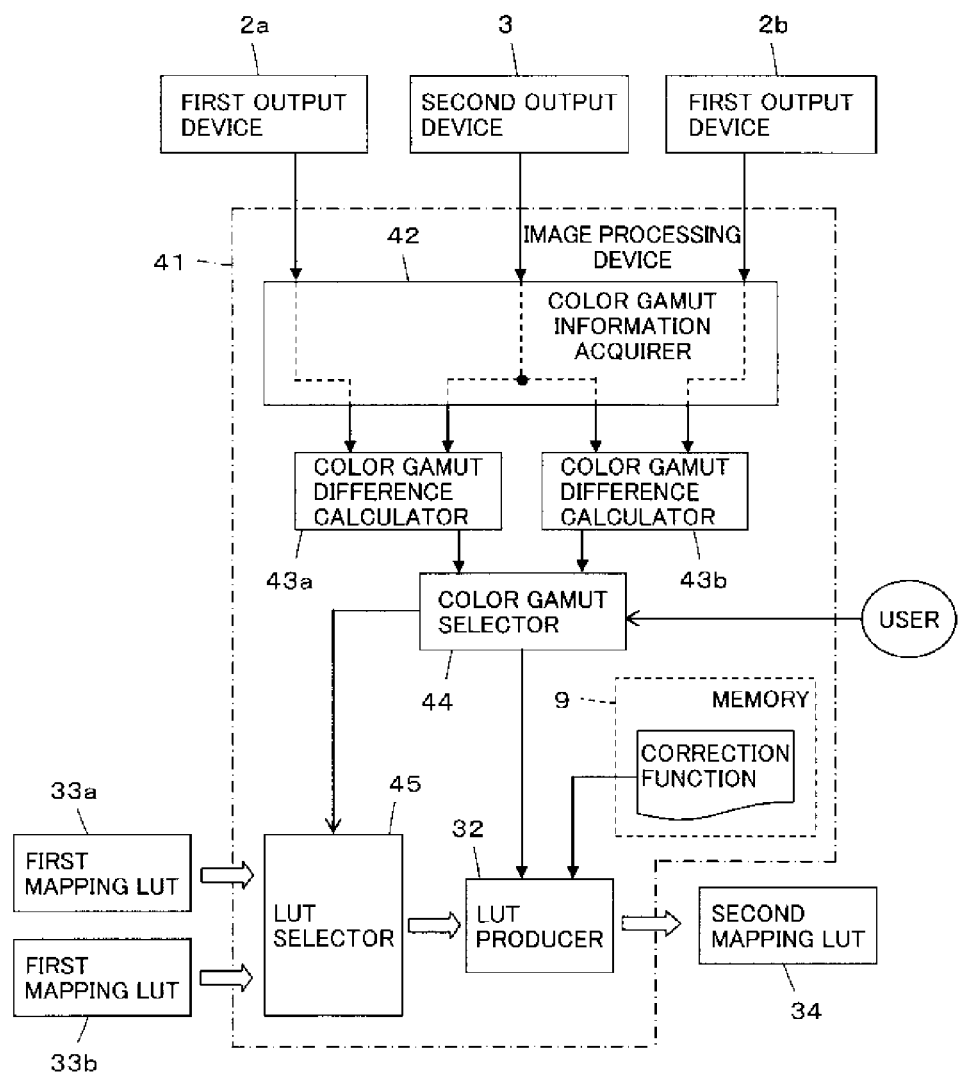
FIG. 14 is a block diagram illustrating a configuration of an image processing device according to a modification of Embodiment 7.

In this embodiment, the selection of the color gamut difference information entered from the color gamut difference calculators 43*a*, 43*b* may be made according to the decision by the user instead of the color gamut selector 44. As with an image processing device 41 illustrated in FIG. 14, the user may, for example, use the color gamut information of the first output devices 2*a*, 2*b* and the second output device 3 or the color reproduction by the output devices to select one of the color gamut difference between the first output device 2*a* and the second output device 3 and the color gamut difference between the first output device 2*b* and the second output device 3 and manually enter the selected color gamut difference in the color gamut selector 44.

The color gamut selector 44 uses the information entered by the user to select either of the color gamut difference information entered from the color gamut difference calculators 43*a*, 43*b* and output the selected information to the LUT producer 32 and the LUT selector 45. The LUT selector 45 uses the color gamut difference information entered from the color gamut selector 20 to select one of the first mapping LUT 33*a* in the first output device 2*a* and the first mapping LUT 33*b* in the first output device 2*b* and output the selected first mapping LUT to the LUT producer 32. The LUT producer 32 uses the color gamut difference information entered from the color gamut selector 44 and the correction function read from the memory 9 to correct the first mapping LUT 33*a* or 33*b* entered from the LUT selector 45 in order to produce the second mapping LUT 34.

Embodiment 8

Figure 15:
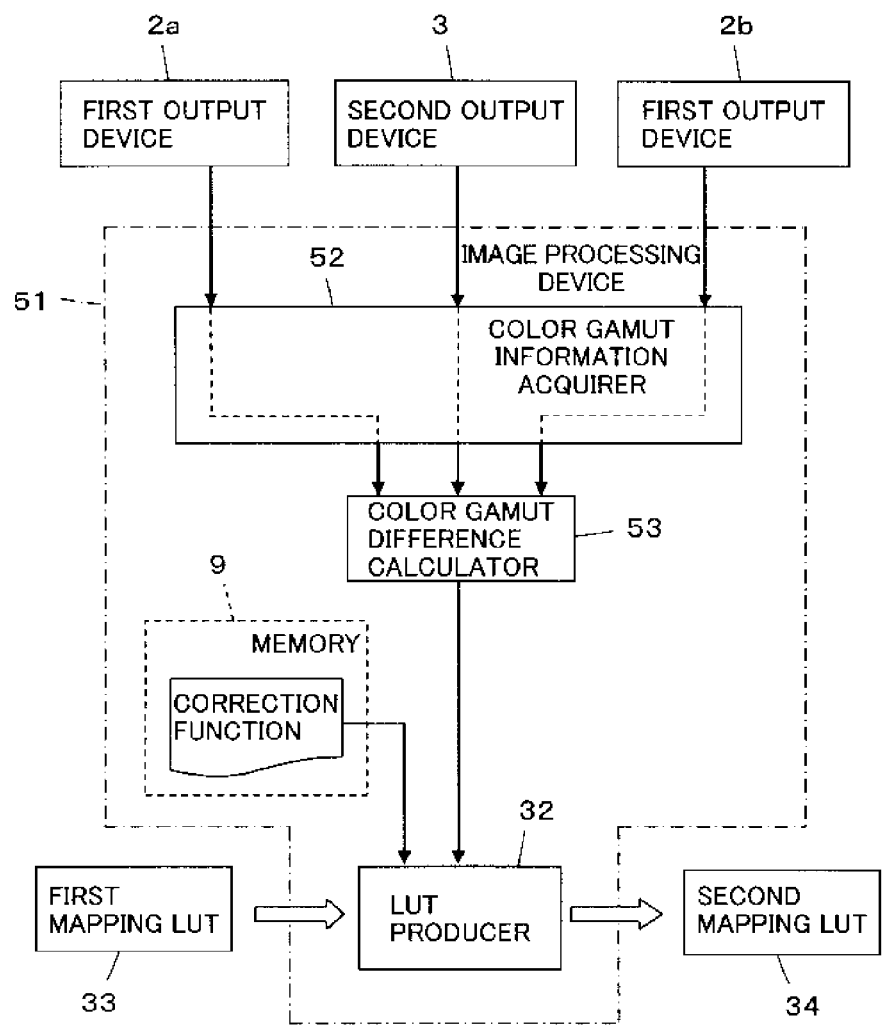
FIG. 15 is a block diagram illustrating a configuration of an image processing device according to Embodiment 8.

FIG. 15 illustrates a configuration of an image processing device 51 according to Embodiment 8. This embodiment is adapted to use all of the color gamut information of the first output devices 2*a*, 2*b* and the color gamut information of the second output device 3 to produce the second mapping LUT 34. The image processing device 51 corresponds to the image processing device 31 according to Embodiment 6 illustrated in FIG. 12 but uses an LUT producer 52 instead of the color gamut information acquirer 4 and a color gamut difference calculator 53 instead of the color gamut difference calculator 7.

It is assumed here that the color gamut of the first output device 2*a* and the color gamut of the first output device 2*b* sandwich the color gamut of the second output device 3 and that the color gamut of the first output device 2*a* is greater than that of the second output device 3 whereas the color gamut of the first output device 2*b* is smaller than that of the second output device 3.

The profiles of the first output device 2*a*, the first output device 2*b*, and the second output device 3 are read into the color gamut information acquirer 52, whereupon the individual color gamut information is outputted to the color gamut difference calculator 53. The color gamut difference calculator 53 calculates the difference between the color gamut information of the first output device 2*a* and the color gamut information of the second output device 3 and the difference between the color gamut information of the first output device 2*b* and the color gamut information of the second output device 3 and outputs the individual color gamut difference information to the LUT producer 32.

The LUT producer 32 uses the color gamut difference information entered from the color gamut difference calculator 53 and the correction function read from the memory 9 to produce the second mapping LUT 34. At this time, the LUT producer 32 corrects the first mapping LUT 33*a* of the first output device 2*a* having the greater color gamut among the first output devices 2*a*, 2*b* having the color gamuts sandwiching the color gamut of the second output device 3 to produce the second mapping LUT 34.

Embodiment 8, which uses a pair of color gamut difference information for the first output devices 2*a*, 2*b* having the color gamuts sandwiching the color gamut of the second output device 3 and corrects the first mapping LUT 33*a* of the first output device 2a having the greater color gamut, achieves production of the second mapping LUT 34 capable of excellent color reproduction with reduced occurrences of color daubing.

Embodiment 9

Figure 16:
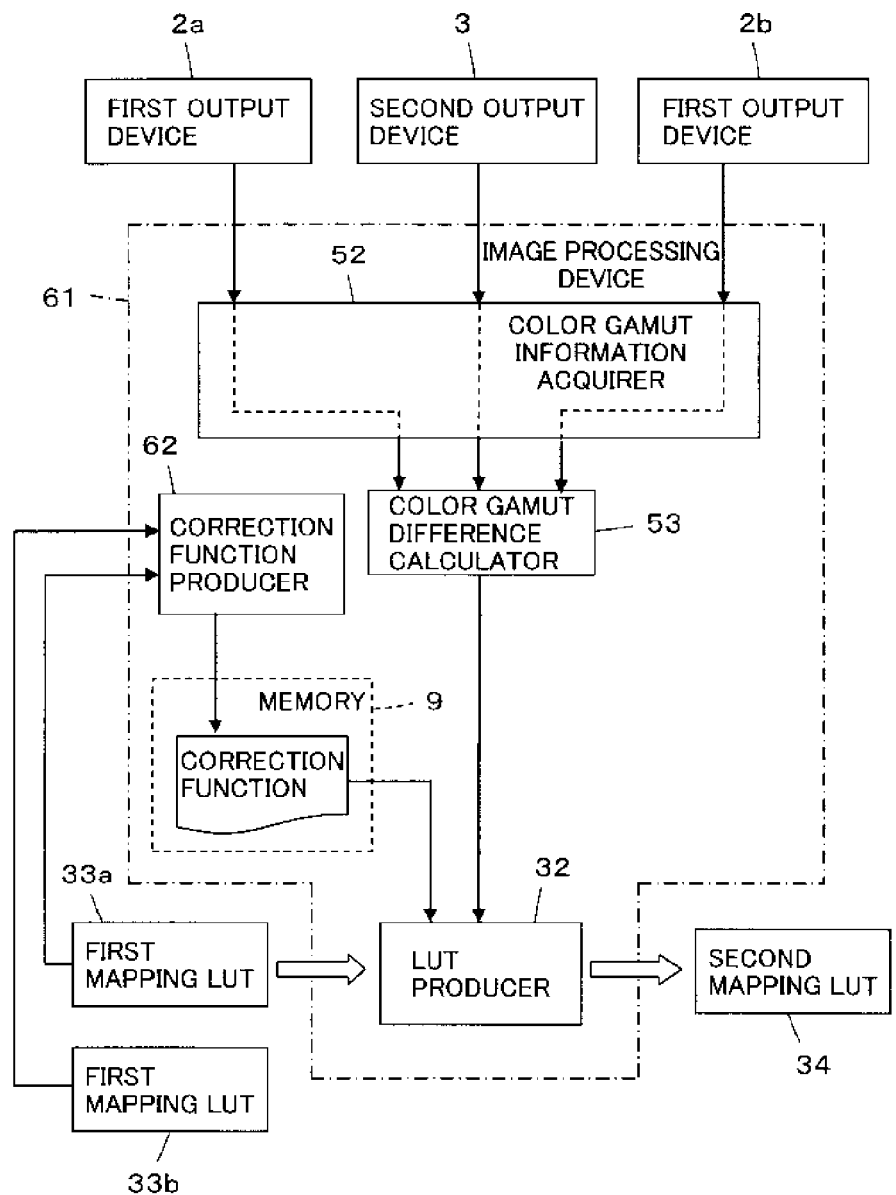
FIG. 16 is a block diagram illustrating a configuration of an image processing device according to Embodiment 9.

FIG. 16 illustrates a configuration of an image processing device 61 according to Embodiment 9. This embodiment is adapted to use the first mapping LUT 33a in the first output device 2a and the first mapping LUT 33b in the first output device 2b to produce the correction function. The image processing device 61 corresponds to the image processing device 51 according to Embodiment 8 illustrated in FIG. 15 but further comprises a correction function producer 62.

It is assumed here that the color gamut of the first output device 2a and the color gamut of the first output device 2b sandwich the color gamut of the second output device 3 and that the color gamut of the first output device 2a is greater than that of the second output device 3 while the color gamut of the first output device 2b is smaller than that of the second output device 3.

The profiles of the first output device 2a, the first output device 2b, and the second output device 3 are read into the color gamut information acquirer 52, whereupon the individual color gamut information is outputted to the color gamut difference calculator 53. The color gamut difference calculator 53 calculates the difference between the color gamut information of the first output device 2a and the color gamut information of the second output device 3 and the difference between the color gamut information of the first output device 2b and the color gamut information of the second output device 3 and outputs the individual color gamut difference information to the LUT producer 32.

The correction function producer 62 uses the first mapping LUT 33a in the first output device 2a and the first mapping LUT 33b in the first output device 2b to produce the correction function for outputting reproduced colors close to those by the first output device 2a. The produced correction function is stored in the memory 9.

The LUT producer 32 uses the color gamut difference information entered from the color gamut difference calculator 53 and the correction function read from the memory 9 to produce the second mapping LUT 34. At this time, the LUT producer 32 corrects the first mapping LUT 33a of the first output device 2a having the greater color gamut among the first output devices 2a, 2b having the color gamuts sandwiching the color gamut of the second output device 3 to produce the second mapping LUT 34.

Embodiment 9, which uses the first mapping LUTs 33a, 33b of both the first output devices 2a, 2b used for primary printing to produce the correction function, can produce the second mapping LUT 34 capable of excellent color reproduction.

The image processing device according to the above embodiments may, for example, be configured by a computer equipped with a CPU, memories, and the like.

The image processing method of the invention may be recorded in a hard disk, a CD-ROM, and other computer-readable recording media as a program for enabling a computer to execute processing.

What is claimed is:

1. An image processing device comprising:
a color gamut information acquirer for acquiring a first color gamut information relating to a first color gamut of a first output device and a second color gamut information relating to a second color gamut of a second output device;
a target value acquirer for acquiring a first color reproduction target value for the first output device converted from a given input color signal so as to be allocated to the first color gamut;
a color gamut difference calculator for calculating a difference between the first color gamut of the first output device and the second gamut of the second output device based on the first color gamut information and the second color gamut information acquired by the color gamut information acquirer; and
a target value generator for producing a second color reproduction target value for the second output device by correcting the first color reproduction target value for the first output device so as to be allocated to the second color gamut of the second output device based on the color gamut difference calculated by the color gamut difference calculator and color information of the given input color signal.

2. The image processing device according to claim 1, wherein the first color reproduction target value for the first output device is an output value of the first output device for a given control value.

3. The image processing device according to claim 2, wherein the given control value is a memory color.

4. The image processing device according to claim 1, wherein each of the first output device and the second output device is one of a printer and a monitor.

5. The image processing device according to claim 1, wherein
the target value generator calculates a color reproduction target value correction amount necessary for the second output device to output reproduced colors close to reproduced colors by the first output device based on a preset correction function representing a curved line passing through the first color reproduction target value for the first output device and a color gamut difference calculated by the color gamut calculator so that the target value generator corrects the first color reproduction target value for the first output device by the calculated color reproduction target value correction amount to produce the second color reproduction target value for the second output device.

6. The image processing device according to claim 5, wherein the preset correction function is obtained by correcting a reference correction function which represents a relationship between color reproduction targets for outputting reproduced colors close to each other in color gamuts different from each other base on the first color reproduction target value for the first output device.

7. The image processing device according to claim 6, wherein the preset correction function is obtained by correcting the reference correction function base on an output value or a measured color value obtained through the first output device.

8. The image processing device according to claim 6, wherein the reference correction function is previously set by conducting a psychophysical experiment.

9. The image processing device according to claim 1, further comprising:
a plurality of first output devices having different first color gamuts from each other and outputting images based on given first color reproduction target values, respectively, wherein the color gamut information acquirer acquires a plurality of color gamut information relating to the first color gamuts of the plurality of first output devices and the second color gamut information of the second output device, wherein the color gamut difference calculator calculates a difference between the first color gamuts of the first output devices and the second color gamut of the second output device, and wherein the target value generator produces the second color reproduction target value for the second output device by using the color reproduction target value for one of the first output devices having a first color gamut that is least different from the second color gamut of the second output device calculated by the color gamut difference calculator.

10. The image processing device according to claim 1, wherein the color gamut information acquirer comprises:

a profile reader for reading a first profile from the first output device and a second profile from the second output device; and a color gamut calculator for calculating the first color gamut information of the first output device from the first profile of the first output device read by the profile reader and calculating the second color gamut information of the second output device from the second profile of the second output device read by the profile reader.

11. The image processing device according to claim 1, wherein the color gamut information acquirer comprises:

a profile reader for reading a second profile from the second output device; and a color gamut calculator for calculating the first color gamut information of the first output device from a reference profile that is preset for the first output device and calculating the second color gamut information of the second output device from the second profile of the second output device read by the profile reader.

12. The image processing device according to claim 1, wherein the color gamut information acquirer comprises:

a mapping vector calculator for calculating a mapping vector of the first output device based on a difference between a reproduced color value corresponding to an input color signal and the first color reproduction target value for the first output device;

a mapping characteristics analyzer for acquiring characteristics of mapping effected by the first output device from the mapping vector calculated by the mapping vector calculator;

a profile reader for reading a second profile from the second output device; and a color gamut calculator for calculating the second color gamut information for the second output device from the second profile of the second output device read by the profile reader, wherein the target value generator produces the second color reproduction target value for the second output device based on characteristics of mapping effected by the first output device obtained by the mapping characteristics analyzer and the second color gamut information of the second output device calculated by the color gamut calculator.

13. The image processing device according to claim 12, wherein the target value generator produces the second color reproduction target value for the second output value so as to output reproduced colors close to reproduced colors by the first output device based on the characteristics of mapping effected by the first output device, the second color gamut information of the second output device, and a preset correction function representing a curved line passing through the first color reproduction target value for the first output device.

14. The image processing device according to claim 12, wherein the mapping characteristics analyzer analyzes weighting characteristics in mapping in the first output device, and the target value generator adds the weighting analyzed by the mapping characteristics analyzer to the correction function to produce the second color reproduction target value for the second output device.

15. The image processing device according to claim 12, wherein the mapping characteristics analyzer determines a fixed region having a mapping vector calculated by the mapping vector calculator that is smaller than a given value and a mapping region having a mapping vector that is equal to or greater than a given value, and wherein the target value generator uses the first color reproduction target value for the first output value as the second color reproduction target value for the second output device without correction in the fixed region, while the target value generator corrects the first color reproduction target value for the first output device to produce the second color reproduction target value for the second output device in the mapping region.

16. The image processing device according to claim 1, further comprising an LUT producer for producing an LUT representing the second color reproduction target value for the second output device corresponding to an input color signal by using the second color reproduction target value for the second output device produced by the target value generator.

17. The image processing device according to claim 16, wherein the LUT producer corrects an LUT representing the first color reproduction target value for the first output device to produce the LUT representing the second color reproduction target value for the second output device.

18. The image processing device according to claim 1, wherein each of the first color gamut of the first output device and the second color gamut of the second output device is one having a single channel.

19. The image processing device according to claim 1, wherein each of the first color gamut of the first output device and the second color gamut of the second output device is one having a plurality of channels.

20. The image processing device according to claim 1, wherein the target value generator receives color information of the input color signal separate from the first and second color gamut information of the first output device and second output device by the color gamut information acquirer.

21. The image processing device according to claim 20, wherein the color information of an input color signal comprises the color gamut information of the input color signal.

22. The image processing device according to claim 1, wherein the color information of an input color signal comprises at least one of color distribution range information or color space information.

23. An image processing method comprising the steps of:

acquiring a first color gamut information relating to a first color gamut of a first output device and a second color gamut information relating to a second color gamut of a second output device;

calculating a difference between the first color gamut of the first output device and the second color gamut of the second output device based on the acquired first color gamut information and the acquired second color gamut information; and producing a second color reproduction target value for the second output device by correcting a first color reproduction target value for the first output device converted from a given input color signal so as to be allocated to the second color gamut of the second output device based on the calculated color gamut difference and color information of the given input color signal.

24. A non-transitory image processing program recording medium for storing an image processing program for causing a computer to execute an image processing method, the image processing program comprising the steps of:

acquiring a first color gamut information relating to a first color gamut of a first output device and a second color gamut information relating to a second color gamut of a second output device;

calculating a difference between the first color gamut of the first output device and the second color gamut of the second output device based on the acquired first color gamut information and the acquired second color gamut information; and producing a second color reproduction target value for the second output device by correcting a first color reproduction target value for the first output device converted from a given input color signal so as to be allocated to the second color gamut of the second output device based on the calculated color gamut difference and color information of the given input color signal.

* * * * *